(12) United States Patent
Baskakov et al.

(10) Patent No.: US 9,977,747 B2
(45) Date of Patent: May 22, 2018

(54) IDENTIFICATION OF PAGE SHARING OPPORTUNITIES WITHIN LARGE PAGES

(71) Applicant: VMware, Inc., Palo Alto, CA (US)

(72) Inventors: Yury Baskakov, Newton, MA (US); Alexander Thomas Garthwaite, Hamilton, MA (US); Rajesh Venkatasubramanian, San Jose, CA (US); Irene Zhang, Seattle, WA (US); Seongbeom Kim, Sunnyvale, CA (US); Nikhil Bhatia, Mountain View, CA (US); Kiran Tati, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 43 days.

(21) Appl. No.: 15/051,940

(22) Filed: Feb. 24, 2016

(65) Prior Publication Data
US 2016/0170906 A1  Jun. 16, 2016

Related U.S. Application Data

(62) Division of application No. 13/935,382, filed on Jul. 3, 2013, now Pat. No. 9,292,452.

(51) Int. Cl.
G06F 12/00 (2006.01)
G06F 12/121 (2016.01)
G06F 12/1009 (2016.01)
G06F 12/02 (2006.01)
G06F 9/455 (2018.01)
G06F 12/1027 (2016.01)

(52) U.S. Cl.
CPC ........ G06F 12/121 (2013.01); G06F 9/45558 (2013.01); G06F 12/023 (2013.01); G06F 12/1009 (2013.01); G06F 12/1027 (2013.01); G06F 2009/45583 (2013.01); G06F 2212/1016 (2013.01); G06F 2212/1044 (2013.01)

(58) Field of Classification Search
None
See application file for complete search history.

(56) References Cited

U.S. PATENT DOCUMENTS

| 6,789,156 | B1 | 9/2004 | Waldspurger | |
| 2007/0288719 | A1 | 12/2007 | Cholleti et al. | |
| 2010/0275193 | A1* | 10/2010 | Hansen | G06F 12/023 717/151 |
| 2012/0011504 | A1 | 1/2012 | Ahmad et al. | |
| 2012/0054466 | A1† | 3/2012 | Devendran et al. | |
| 2012/0131259 | A1* | 5/2012 | Baskakov | G06F 12/109 711/6 |
| 2012/0290765 | A1† | 11/2012 | Durrant | |

(Continued)

Primary Examiner — Brian Peugh
(74) Attorney, Agent, or Firm — Patterson & Sheridan, LLP

(57) ABSTRACT

Memory performance in a computer system that implements large page mapping is improved even when memory is scarce by identifying page sharing opportunities within the large pages at the granularity of small pages and breaking up the large pages so that small pages within the large page can be freed up through page sharing. In addition, the number of small page sharing opportunities within the large pages can be used to estimate the total amount of memory that could be reclaimed through page sharing.

20 Claims, 5 Drawing Sheets

(56) References Cited

U.S. PATENT DOCUMENTS

| | | |
|---|---|---|
| 2013/0132704 A1 | 5/2013 | Ware |
| 2013/0145377 A1* | 6/2013 | Chen .................... G06F 9/5016 |
| | | 718/104 |
| 2014/0359238 A1 | 12/2014 | Imazaki et al. |
| 2015/0127767 A1* | 5/2015 | Gheith ................ G06F 12/1009 |
| | | 709/214 |

\* cited by examiner
† cited by third party

IDENTIFICATION OF PAGE SHARING OPPORTUNITIES WITHIN LARGE PAGES

This application is a divisional of and claims priority benefit of U.S. patent application Ser. No. 13/935,382, filed Jul. 3, 2013, now U.S. Pat. No. 9,292,452, issued Mar. 22, 2016, the entire contents of which are incorporated by reference herein.

BACKGROUND

Operating systems and hypervisors that support execution of virtual machines running in computer systems typically employ hierarchically arranged page tables to manage mapping of memory from a virtual memory space to a physical memory space that is divided into pages. When a page is mapped from an entry of a page table at the lowest level, the size of the page that is mapped is typically 4 KB. When a page is mapped from an entry of a page table that is one level higher, the size of the page that is mapped is typically 2 MB. When memory is plentiful, significant improvements in memory performance is observed by mapping to large (e.g., 2 MB) pages. However, as memory becomes scarce, memory performance of an operating system or a hypervisor employing large pages degrades quickly and becomes worse than when small (e.g., 4 KB) pages are employed.

SUMMARY

One or more embodiments provide techniques to improve memory performance in a computer system that implements large page mapping. According to embodiments, page sharing opportunities at the granularity of small pages are identified within pages that are mapped large and this information is used in selecting large pages to break up when memory becomes scarce so that small pages within the large page can be freed up through page sharing.

A method of reclaiming memory in a computer system according to an embodiment includes the steps of selecting a large page based on a number of small page sharing opportunities identified therein, updating mappings for the memory so that a mapping to the selected large page is changed to mappings to small pages, where at least one of the small pages is a shared small page, and marking one or more of the small pages as free.

A method of determining an amount of memory that can be reclaimed through page sharing in a computer system, according to an embodiment, includes the steps of scanning each of the large pages and determining from the scanning a number of small pages therein that can be shared, and determining an amount of memory that can be reclaimed based on a total number of small pages that can be shared as determined from the scanning of all of the large pages.

A computer system according to an embodiment includes virtual machines executed therein and a hypervisor configured to support execution of the virtual machines, wherein the hypervisor is configured to map a virtual memory space to a physical memory space of the computer system that is logically partitioned into large pages and small pages, and to determine a number of small pages within a given large page whose contents are the same as another small page.

Further embodiments of the present invention include a non-transitory computer-readable storage medium comprising instructions that cause a computer system to carry out one or more of the above methods as well as a computer system configured to carry out one or more of the above methods.

DETAILED DESCRIPTION

Figure 1:
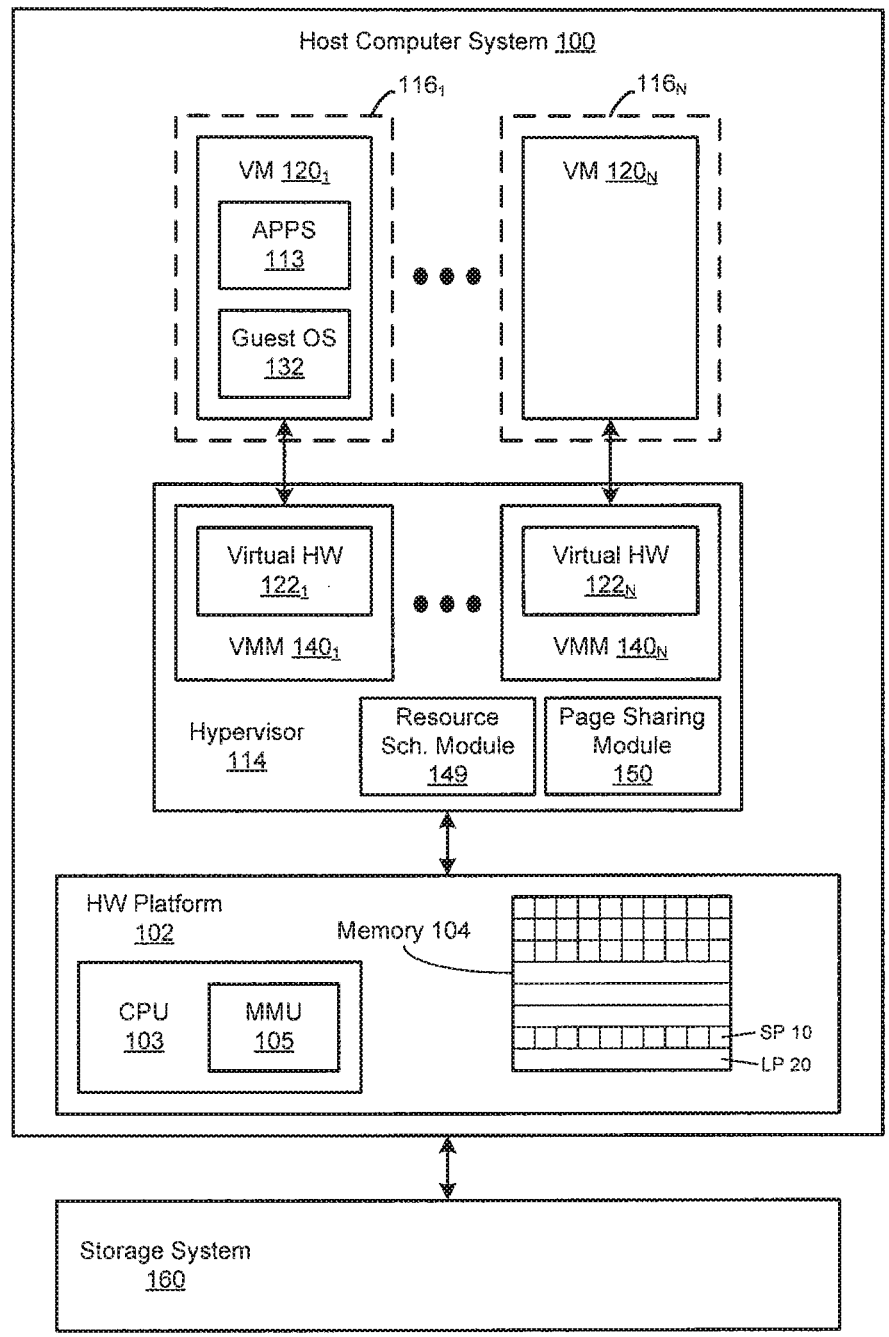
FIG. 1 is a block diagram of a virtualized computer system that is configured to identify page sharing opportunities within large pages according to one or more embodiments.

FIG. 1 is a block diagram of a virtualized computer system that is configured to identify page sharing opportunities within large pages according to one or more embodiments. Host computer system 100 may be constructed on a desktop, laptop or server grade hardware platform 102, such as an x86 architecture platform. Hardware platform 102 includes one or more central processing units (CPU) 103, host physical memory 104, and other standard hardware components such as network interface controllers (not shown) that connect host computer system 100 to a network and one or more host bus adapters (not shown) that connect host computer system 100 to a persistent storage device, illustrated herein as storage system 160.

A hypervisor 114 is installed on top of hardware platform 102. Hypervisor 114 supports multiple virtual machine execution spaces $116_1$-$116_N$, within each of which a VM process may be executed to instantiate corresponding VMs $120_1$-$120_N$. For each of VMs $120_1$-$120_N$, a resource scheduling module 149 of hypervisor 114, which includes a CPU scheduling module and a memory scheduling module, manages a corresponding virtual hardware platform (i.e., virtual hardware platforms $122_1$-$122_N$) that includes emulated hardware such as virtual CPUs (vCPUs) and guest physical memory. Each virtual hardware platform 122 supports the installation of a guest operating system (OS) (e.g., guest OS 132). In each instance, the guest OS provides user-level applications running in the virtual machine, e.g., APPS 113, an interface to the virtual hardware platform of the virtual machine.

It should be recognized that the various terms, layers and categorizations used to describe the virtualization components in FIG. 1 may be referred to differently without departing from their functionality or the spirit or scope of the invention. For example, virtual hardware platforms $122_1$-$122_N$ may be considered to be part of virtual machine monitors (VMM) $140_1$-$140_N$ which implement the virtual system support needed to coordinate operations between hypervisor 114 and their respective VMs. Alternatively, virtual hardware platforms $122_1$-$122_N$ may also be considered to be separate (e.g., as a component of its corresponding virtual machine since such platforms include the hardware emulation components for the virtual machine) from VMMs $140_1$-$140_N$, and VMMs $140_1$-$140_N$ may be considered to be separate from hypervisor 114. One example of hypervisor 114 that may be used is included as a component of VMware's vSphere product, which is commercially available from VMware, Inc. of Palo Alto, Calif. It should further be recognized that other virtualized computer systems are contemplated, such as hosted virtual machine systems, where the hypervisor is implemented in conjunction with a host operating system.

CPU 103 has a memory management unit (MMU) 105 that carries out the mappings from a virtual address space of VMs 120$_1$-120$_N$ or any other applications running on hypervisor 114 to a physical address space of memory 104 (referred to herein as the "host physical address space") using either a translation look-aside buffer (not shown) or page tables (not shown) stored in memory 104. In embodiments using shadow page tables to map guest virtual address spaces within VMs 120$_1$-120$_N$ directly to the physical address space of memory 104, the virtual address space of VMs 120$_1$-120$_N$ referred to herein corresponds to one of the guest virtual address spaces within VMs 120$_1$-120$_N$, and the page tables referenced herein correspond to the shadow page tables. In embodiments using extended or nested page tables where guest virtual address spaces within VMs 120$_1$-120$_N$ are mapped to a guest physical address space using guest pages tables and the guest physical address space is mapped to the host physical address space using extended or nested page tables, the virtual address space of VMs 120$_1$-120$_N$ referred to herein corresponds to the guest physical address space and the page tables referenced herein correspond to the extended or nested page tables. The mappings may be to a small page (SP) 10 in memory 104 or a large page (LP) 20 in memory 104. In the x86 architectures, the typical size for small pages is 4 KB and the typical size for large pages is 2 MB. However, it should be recognized that embodiments may be practiced with different small page sizes and different large page sizes.

Although memory performance improves with the use of large pages, page sharing at the granularity of large pages becomes more difficult for several reasons. First, finding large pages with matching contents is less likely. Second, large pages are more likely to be modified at which point page sharing will have to be terminated. This is true even though small pages within the large page can still be shared. For this reason, embodiments provide a page sharing module 150 that is programmed to identify opportunities for page sharing at the granularity of small pages within the large pages and free up memory allocated to such small pages through page sharing. The techniques to free up memory through page sharing are described in detail in U.S. Pat. No. 6,789,156, the entire contents of which are incorporated by reference herein.

Figure 2A:
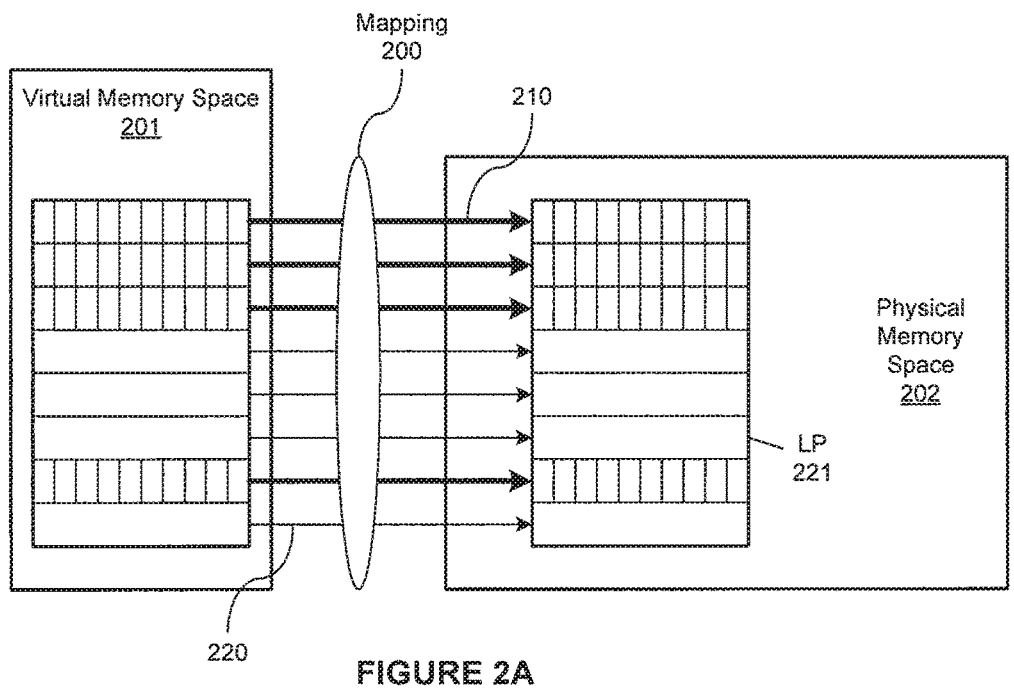
FIGS. 2A and 2B are conceptual diagrams that illustrate mappings of small and large pages from a virtual memory space to a physical memory space.
Figure 2B:
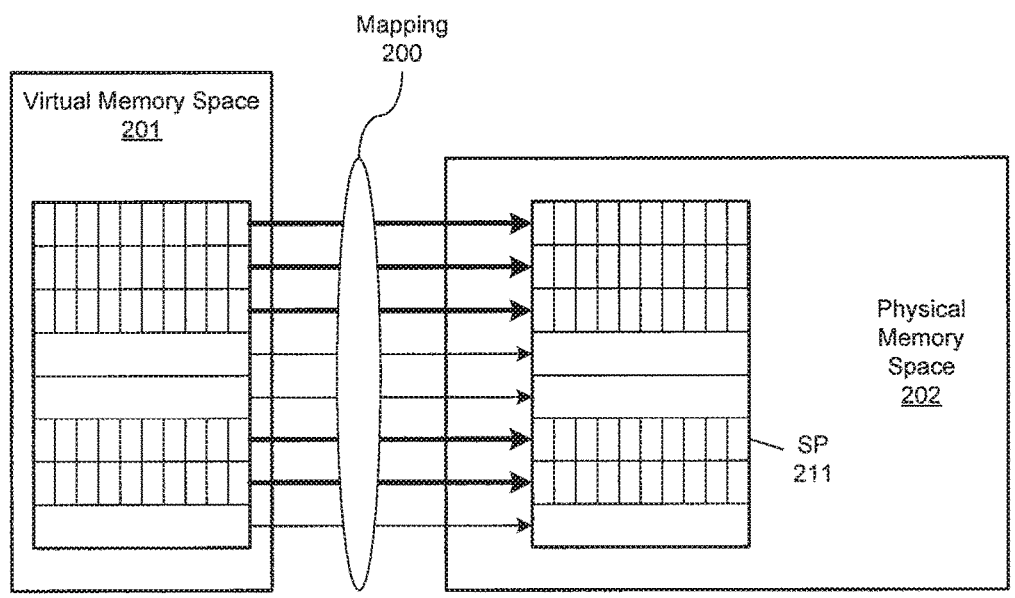

FIGS. 2A and 2B are conceptual diagrams that illustrate mappings 200 of small and large pages from a virtual memory space 201 to a physical memory space 202. Small page mappings are indicated by a single thick arrow (e.g., arrow 210). It should be understood that each small page in virtual memory space 201 on the left side of this arrow is mapped to a corresponding small page in physical memory space 202 on the right side of this arrow. A large page mapping is indicated by a thinner arrow (e.g., arrow 220).

When a page in physical memory space 202 is mapped large, page tables are updated to indicate a large page mapping. For example, in an embodiment that employs hierarchically arranged page tables, the large page is mapped not from the lowest-level page table but from a page table that is next level up from the lowest-level page table. In addition, the page table entry corresponding to the large page is updated to indicate there is no page table at a lower level. FIG. 2A shows a state of memory 104 where physical memory space 202 is partitioned into both small and large pages. One of the large pages is shown as LP 221. In situations where it makes sense for the large page to be broken up, e.g., when there are opportunities for page sharing at the granularity of small pages within the large page and memory is becoming scarce, the large page may be broken up into small pages. FIG. 2B shows the state of memory after LP 221 has been broken up into small pages (SP 211).

Figure 3A:
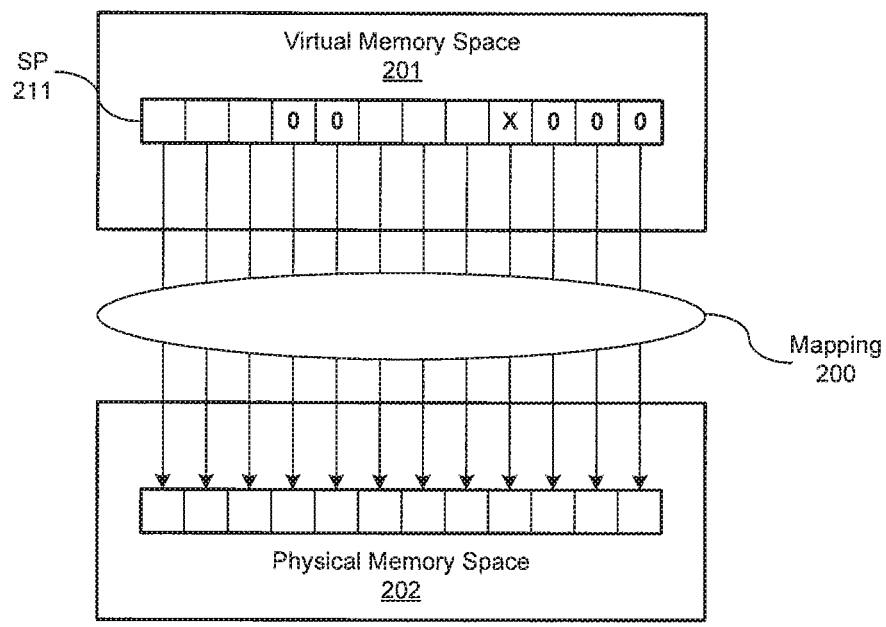
FIGS. 3A and 3B are conceptual diagrams that illustrate changes in the mappings of small pages according to one or more embodiments.
Figure 3B:
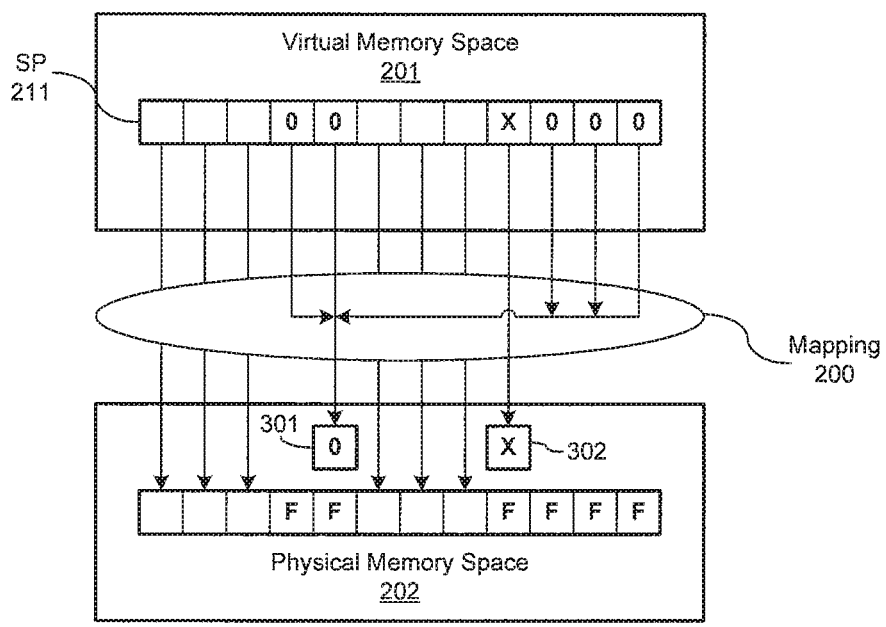

FIGS. 3A and 3B are conceptual diagrams that illustrate changes in the mappings of small pages when page sharing is executed for those small pages of SP 211 that have the same content as one of shared pages in memory 104, which may be pages that have known content, such as a zero page or a page with a simple pattern (represented as page 301 in FIG. 3B). Other shared pages are represented as page 302 in FIG. 3B. FIG. 3A shows the state of memory 104 prior to the execution of page sharing, and FIG. 3B shows the state of memory 104 after the execution of page sharing. As a result of the page sharing, one or more small pages are freed up. In this example, six small pages indicated with "F" are shown as being freed up.

Figure 4:
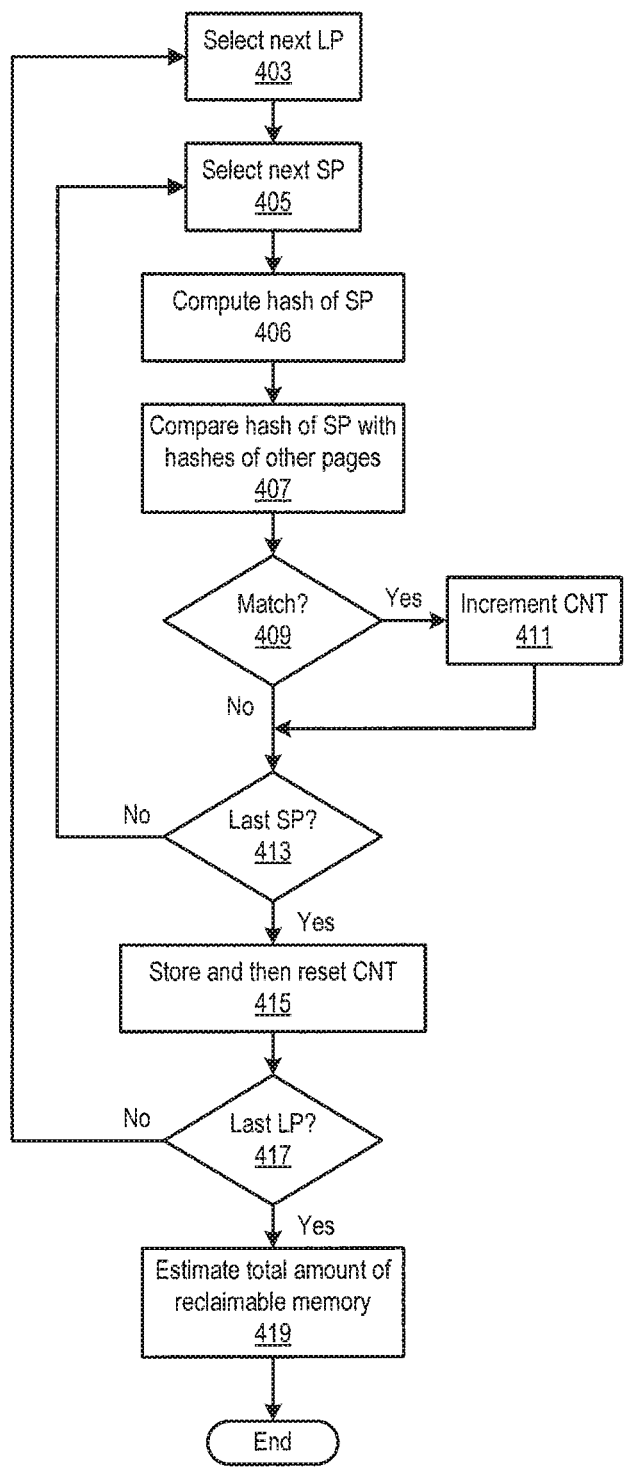
FIG. 4 depicts a flow diagram that illustrates a method that includes the steps of identifying page sharing opportunities, according to an embodiment.

FIG. 4 depicts a flow diagram that illustrates a method that includes the steps of identifying page sharing opportunities, according to an embodiment. In the embodiment illustrated herein, page sharing module 150 is rotating through a complete set of large pages on a periodic basis and executing this method in a background thread. The rate at which this method is executed may be adjusted according to the state of memory 104. For example, as memory becomes scarce as determined by the memory scheduling module, this rate is increased, and conversely, as memory becomes more plentiful as determined by the memory scheduling module, this rate is decreased. In addition, for efficiency, matches between small pages are found by comparing hashes of the small pages. In alternative embodiments, other techniques for finding matches between small pages which do not require hash computations may be used.

This method begins at step 403 where page sharing module 150 selects a large page to be examined for page sharing opportunities. Then, within the large page, page sharing module 150 selects a small page at step 405 and computes a hash of the small page at step 406. Then, page sharing module 150 compares the hash computed at step 406 with hashes of other small pages at step 407. If a match is determined (step 409), a counter variable, CNT, is incremented by one (step 411). This comparison is carried out for all the small pages within the large page selected at step 403 that are non-zero pages and the counter variable, CNT, incremented accordingly. For small pages that are zero pages, steps 406, 407, and 409 are skipped and step 411 is executed after the zero small page is detected upon selection at step 405. When it is determined at step 413 that there are no more small pages in the selected large page, step 415 is executed where the value of the counter variable, CNT, is stored in a table or in any similar data structure and then reset to zero. The table or similar data structure tracks the number of page sharing opportunities for each of the different large pages of memory 104 at a given time. It should be recognized that as pages within memory 104, including the large pages being scanned according to this method, are modified as time progresses, content within a particular large page may change and, as a result, the number of actual page sharing opportunities may be different from the number stored in the table, when this large page is broken up to enable page sharing. When the last large page has been processed, as determined at step 417, page sharing module 150 estimates at step 419 the total amount of memory that could be reclaimed by executing page sharing for shareable small pages within the large pages. In one embodiment, page sharing module 150 obtains this estimate by summing up all of the CNT values stored in the tracking table and multiplying by the small page size. In another embodiment, page sharing module 150 applies a correction factor to this estimate, where the correction factor is determined by tracking the actual number of small pages that are determined to be shareable (described below in conjunction with step 518) when a large page is broken up and comparing the actual number with the CNT value stored for that particular large page. For example, if page sharing module 150 determines that it overestimated the number of shareable pages by a factor of two per large page, the total amount of memory that could be reclaimed would be estimated by dividing by two each of the CNT values stored in the tracking table and then multiplying the sum of all the adjusted CNT values by the small page size.

In the embodiment described above, a single CNT value is maintained for each large page. In alternative embodiments, multiple CNT values may be maintained for each large page. For example, one CNT value may be maintained for sharable pages that are zero pages and another CNT value may be maintained for non-zero sharable pages.

Figure 5:
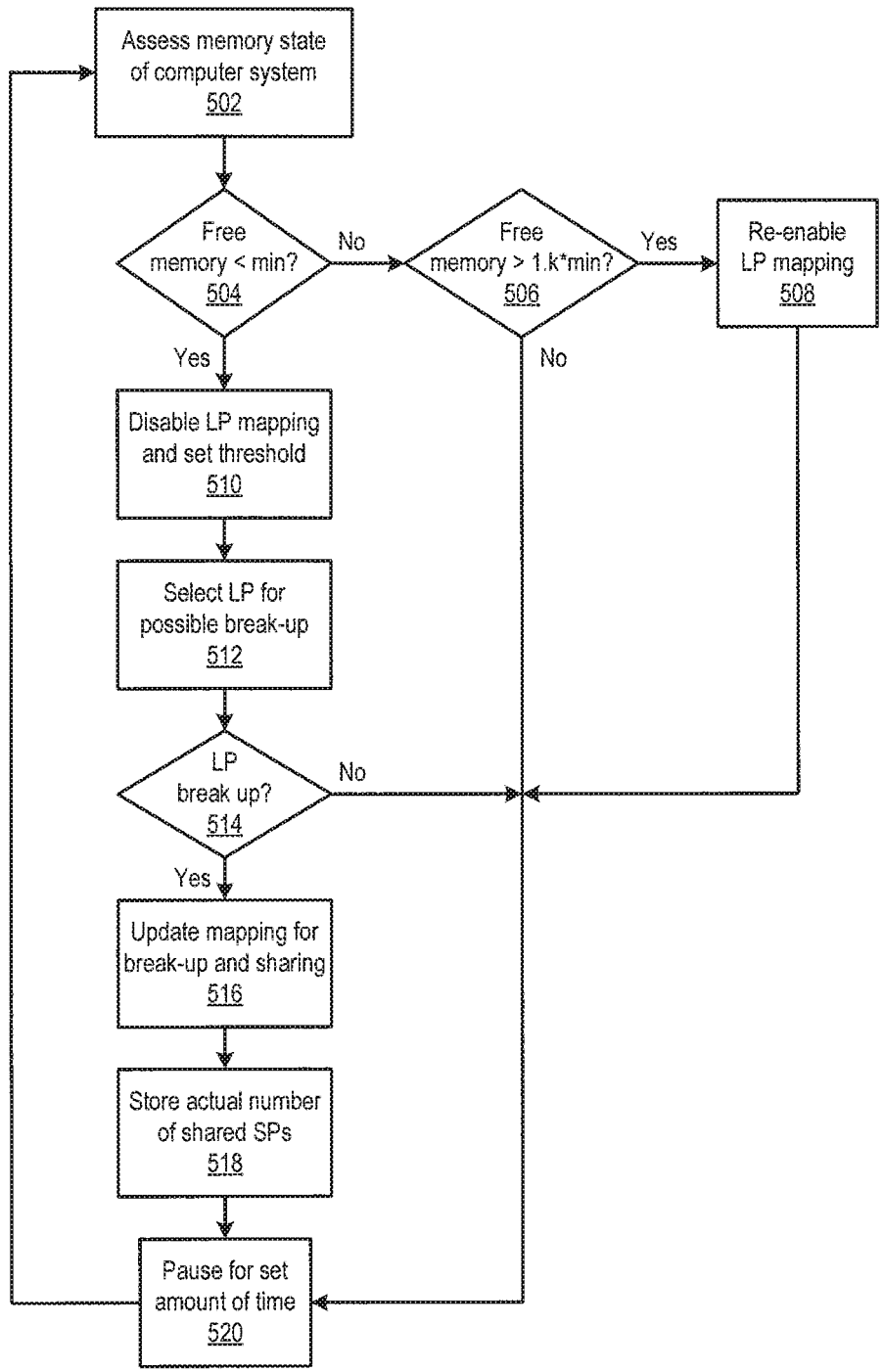
FIG. 5 depicts a flow diagram that illustrates a method that includes the steps of breaking up large pages to enable page sharing, according to an embodiment.

FIG. 5 depicts a flow diagram that illustrates a method that includes the steps of breaking up large pages to enable page sharing, according to an embodiment. In the embodiment illustrated herein, page sharing module 150 is programmed to execute this method in a background thread on a periodic basis.

This method begins at step 502 where the memory scheduling module of hypervisor 114 assesses the memory state of memory 104. This may be done by examining memory usage statistics maintained by hypervisor 114. If the amount of free memory is below a predefined minimum as determined at step 504, additional large page mapping by hypervisor 114 is disabled and a threshold is set for breaking up a large page so that small pages within the large page can be freed up through page sharing (step 510). The threshold is a number that represents the minimum number of shareable small pages within a large page for that large page to be broken up to enable small pages therein to be freed up through page sharing. The threshold is adjusted upwards or downwards based on the free memory state. If the amount of free memory is low, the threshold is adjusted downwards. If the amount of free memory is high, the threshold is adjusted upwards.

At step 512, page sharing module 150 selects a large page for possible break-up. In one embodiment, the selection is made according to the order of the large pages appearing in the tracking table. In another embodiment, the selection is made according to a descending order of the CNT values with a large page having the largest CNT value being processed first. Further, the selection may take into an access frequency of the large page, which may be determined according to techniques described in U.S. patent application Ser. No. 12/834,662, the entire contents of which are incorporated by reference herein. For example, for large pages that have an equal number of shareable small pages, selection preference should be given to the large page whose access frequency is lower (in other words, to large pages that are colder). In some embodiments, weighting factors are applied to each of these two factors for affecting the large page selection. In yet another embodiment, the selection of the large page is made randomly. As memory becomes scarce or as the amount of free memory decreases, a higher weighting factor is given to the number of shareable small shareable pages in a given large page rather than to its coldness value. As memory becomes more plentiful or as the amount of free memory increases, a higher weighting factor is given to a given large page's coldness value rather than to the number of shareable small shareable pages therein.

Then, at step 514, page sharing module 150 determines if the selected large page has at least the requisite number of shareable pages (e.g., CNT value>threshold, where the CNT value can be the CNT value stored in step 415, or such CNT value that is adjusted by a correction factor as described above). If so, step 516 is executed where page sharing module 150 causes the page tables to be updated so that the large page is now mapped small and page table entries of shareable small pages reference shared pages. For example, the page table entry corresponding to the large page is updated to indicate that there is a page table at a lower level and entries of this page table are updated so that they reference: (i) small pages within the large page that has been broken up (for those small pages that cannot be shared) or (ii) shared pages (for those small pages that can be shared). It should be understood that a final determination as to whether a small page can be shared or not is made at this time in accordance with the techniques described in U.S. Pat. No. 6,789,156. After this determination for all of the small pages within the large page that has been broken up, the actual number of small pages that were determined to be shareable is stored in the tracking table at step 518 so that the correction factor can be determined using this number as described above. Then, at step 520, after pausing for a period of time, the flow returns to step 502. The amount of time paused may be adjusted downwards if the amount of free memory is less than the predefined minimum (as determined at step 504) or upwards if the amount of free memory is above the predefined minimum by a sufficient margin (as determined at step 506).

Step 514 is not a part of all embodiments. In embodiments where large pages are ranked based on the selection criteria and/or weighting factors described above, the large pages will be broken up in order based on their ranks until the amount of free memory is no longer less than the predefined minimum as determined at step 504. Therefore, in such embodiments, step 516 will be executed after step 512.

Returning to step 504, if the memory scheduling module of hypervisor 114 determines that the amount of free memory is greater than the predefined minimum, the memory scheduling module of hypervisor 114 performs a check at step 506 to determine if the amount of free memory is above the predefined minimum by a sufficient margin (e.g., 1.k times the predefined minimum, where the constant "k" may be any positive integer and is selected to prevent the free memory state from cycling back and forth between low and high states). Thus, step 508 is executed only after the amount of free memory has increased to above the predefined minimum by a sufficient margin. At step 508, additional large page mapping is re-enabled so that hypervisor 114 can return to mapping pages large to improve performance.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer system comprising:
   virtual machines executed therein; and
   a hypervisor configured to support execution of the virtual machines, wherein the hypervisor is configured to map a virtual memory space to a physical memory space that is logically partitioned into large pages and small pages, and to determine a number of small pages within a large page of the large pages whose contents are the same as another small page.

2. The computer system of claim 1, wherein the hypervisor is further configured to: determine an amount of memory that can be reclaimed based on the number of small pages within the large page whose contents are the same as another small page.

3. The computer system of claim 2, wherein the hypervisor is further configured to: reclaim the memory by splitting the large page into a set of small pages and freeing at least one small page of the set of small pages whose contents are the same as another small page.

4. The computer system of claim 1, wherein the hypervisor is further configured to: scan the physical memory space to determine a number of small pages whose contents are the same as another small page for multiple large pages in the physical memory space.

5. The computer system of claim 4, wherein the scanning of the physical memory space is performed periodically based on an amount of memory that is free in the physical memory space.

6. The computer system of claim 1, wherein the hypervisor is further configured to: select the large page by comparing counts associated with different large pages of the physical memory space, each count being a count of a number of small pages of a respective large page whose contents are the same as another small page.

7. The computer system of claim 1, wherein the hypervisor is further configured to: select the large page based on a comparison of access frequencies of different large pages of the physical memory space.

8. The computer system of claim 1, wherein the hypervisor is further configured to: select the large page by comparing a number of small pages of the large page whose contents are the same as another small page with a threshold number that is dependent on an amount of free memory in the physical memory space.

9. The computer system of claim 1, wherein: the contents of the small pages whose contents are the same as another small page are zeroes.

10. A method for reclaiming memory in a computer system executing virtual machines, the method comprising:
    mapping a virtual memory space to a physical memory space that is logically partitioned into large pages and small pages; and
    determining a number of small pages within a large page of the large pages whose contents are the same as another small page.

11. The method of claim 10, further comprising: determining an amount of memory that can be reclaimed based on the number of small pages within the large page whose contents are the same as another small page.

12. The method of claim 11, further comprising: reclaiming the memory by splitting the large page into a set of small pages and freeing at least one small page of the set of small pages whose contents are the same as another small page.

13. The method of claim 10, further comprising: scanning the physical memory space to determine a number of small pages whose contents are the same as another small page for multiple large pages in the physical memory space.

14. The method of claim 13, wherein the scanning of the physical memory space is performed periodically based on an amount of memory that is free in the physical memory space.

15. The method of claim 10, wherein selecting the large page comprises: selecting the large page by comparing counts associated with different large pages of the physical memory space, each count being a count of a number of small pages of a respective large page whose contents are the same as another small page.

16. The method of claim 10, wherein selecting the large page comprises: selecting the large page based on a comparison of access frequencies of different large pages of the physical memory space.

17. The method of claim 10, wherein selecting the large page comprises: selecting the large page by comparing a number of small pages of the large page whose contents are the same as another small page with a threshold number that is dependent on an amount of free memory in the physical memory space.

18. The method of claim 10, wherein: the contents of the small pages whose contents are the same as another small page are zeroes.

19. A non-transitory computer-readable medium that, when executed by a processor, cause the processor to perform method for reclaiming memory in a computer system executing virtual machines, the method comprising:
mapping a virtual memory space to a physical memory space that is logically partitioned into large pages and small pages; and
determining a number of small pages within a large page of the large pages whose contents are the same as another small page.

20. The non-transitory computer-readable medium of claim 19, wherein the method further comprises:
determining an amount of memory that can be reclaimed based on the number of small pages within the large page whose contents are the same as another small page; and
reclaiming the memory by splitting the large page into a set of small pages and freeing at least one small page of the set of small pages whose contents are the same as another small page.

* * * * *